United States Patent
Toliver et al.

(10) Patent No.: US 10,403,171 B2
(45) Date of Patent: Sep. 3, 2019

(54) SYSTEM PROVIDING CUSTOMIZED REMEDIAL TRAINING FOR DRIVERS

(71) Applicants: Jerome Toliver, Fallbrook, CA (US); Mauricio Berber, Houston, TX (US)

(72) Inventors: Jerome Toliver, Fallbrook, CA (US); Mauricio Berber, Houston, TX (US)

( * ) Notice: Subject to any disclaimer, the term of this patent is extended or adjusted under 35 U.S.C. 154(b) by 52 days.

(21) Appl. No.: 15/354,606

(22) Filed: Nov. 17, 2016

(65) Prior Publication Data
US 2018/0137780 A1    May 17, 2018

(51) Int. Cl.
 *G09B 19/16*  (2006.01)
 *G09B 5/06*   (2006.01)
 *G09B 7/00*   (2006.01)
 *G09B 19/14*  (2006.01)

(52) U.S. Cl.
 CPC .......... *G09B 19/167* (2013.01); *G09B 5/065* (2013.01); *G09B 7/00* (2013.01); *G09B 19/14* (2013.01)

(58) Field of Classification Search
 CPC ........ G09B 19/167; G09B 5/065; G09B 7/00; G09B 19/14
 USPC .......................................................... 434/65
 See application file for complete search history.

(56) References Cited

U.S. PATENT DOCUMENTS

2010/0143872 A1* 6/2010 Lankteee ............. G09B 19/167
                                                      434/65
2012/0135382 A1* 5/2012 Winston .................. G09B 9/04
                                                      434/65

* cited by examiner

*Primary Examiner* — Robert P Bullington
(74) *Attorney, Agent, or Firm* — Donn K. Harms

(57) ABSTRACT

A system is provided for determining likely and ongoing driving habits of registered drivers working for employers. The system using software adapted to operate and perform the system tasks, ascertains remedial driving courses for determined driving habits requiring them, and subsequently provides the driving courses to chosen drivers. The system tracks ongoing driver performance and compliance with assigned courses and provides notification of such to employers of the drivers.

10 Claims, 2 Drawing Sheets

SYSTEM PROVIDING CUSTOMIZED REMEDIAL TRAINING FOR DRIVERS

BACKGROUND OF THE INVENTION

1. Field of the Invention

The present invention relates to a driver performance monitoring system. More particularly, the present invention relates to a software enabled system which employs collected personalized information on each driver, a driver performance history as well as collected data concerning current driver performance, to automatically ascertain and assign relevant driver training content to drivers. The customized remedial training for each driver is calculated to subsequently reduce driver risk levels and thereby promote safer driving by drivers. The system herein is widely employable for such monitoring and customized training for businesses, government, commercial carriers. Further, the system herein is also adapted for use with insurance carriers for insured driver training and remediation, for business monitoring and driver remediation of independent contractors, and for consumers directly. Therefore, any reference to a particular market or driver type herein is for ease of description and should in no manner be considered as limiting the scope or deployment of the system herein.

2. Prior Art

Many businesses have employees and business representatives who drive on behalf of the firm, for deliveries as well as for visiting clients. Government entities, across the nation, have employees who must drive as part of their job, on behalf of the government agency, to visit people, business, and locations where their presence may be required.

Because driving employees of both business and government are essentially an extension of their employer, it is a particular concern to make sure they are driving safely. This is because their can be a high potential for liability to the employer, for actions by employees while driving. Further, safe and courteous driving is also something that reflects on the employer when third parties can ascertain, from the vehicle driven, the identity of their employer.

The same issues arise with commercial carriers who employ drivers of large trucks and other vehicles. The Federal Motor Carrier Safety Administration's (FMCSA) Compliance, Safety, and Accountability (CSA) program requires that commercial carriers employing drivers be vigilant about driver hiring. This program additionally requires carriers employing drivers of large trucks and commercial vehicles to provide ongoing monitoring and training to ensure that all drivers are performing their duties in a safe and professional manner.

As a consequence of liability, legal requirements, and insurance requirements, businesses, government agencies, and commercial carriers have initiated programs for increasing safety and reducing accidents by their employees who drive. Such programs generally have an ultimate goal of reducing accidents and injuries caused by poor or unsafe driving habits of employed drivers.

However, such programs are less than effective because they generally are based on information collected on driving employees, after an unsafe or discourteous driving event has occurred, and then reported to the employer. While commercial carriers may have "black boxes" in large trucks to record driving by their employees, such is not the case for businesses and government agencies where employees are driving personal cars or pickup trucks. As a consequence, reviewing the driving habits of employees on an ongoing basis, if it occurs in business and government, is at best problematic, as it is based on the few reports of unsafe and problematic drivers, where third parties might take the time to do so.

Further, an issue arises in the hiring of employees for government and businesses in determining new employees ability to drive safely and courteously. Currently, if any review is done on new drivers, it is by obtaining their driving record from a motor vehicle department, which may list past infractions. However, many drivers who receive driving infraction tickets are able to have them removed from their record by attending traffic school or the like. Further, it is not unknown that a new employee will have a license in a new state, and their prior record in a different state will go unnoticed.

As a consequence, businesses and government agencies who hire employees who drive, have little to use as a predictor of the likely driving habits of a newly hired employee. Further, because most reports of unsafe driving occur after an occurrence, if a report is even received, ascertaining safe driving habits of employees of such businesses and government agencies, is poorly handled.

Even where employers and government agencies do attempt some sort of ongoing driver monitoring and educational program, such are usually a generic or generalized approach to safety and education for their drivers on an ongoing basis. Such programs rarely are able to access individual drivers and their habits, and determine a customized remedial plan to meet each driver's needs.

Further, when actually providing such courses to their drivers, employers must remove them from the road and into classrooms or meeting rooms, where they are paid but not producing revenue or results. While the goal of driver safety is ascertained as worth the cost for such continuing education for drivers, the provision of generalized safety and information courses which are not prioritized and customized for each driver's needs is not the best use of the driver's time or the cost expended by the employer.

As such, there is a continuing unmet need for a system which will identify specific areas for instruction which are customized for each driver to improve identified driver performance shortcomings in need of safety or improvement. Such a system should be able to ascertain potential areas for instruction of newly hired employees where little or no driving record is available. Such a system should be configured to take into consideration a collected ongoing driving record of each driver, as well as collected driving data from motor vehicle departments and the like, for customizing ongoing instruction to the determined need of each driver.

Thereafter, such a system should enable the drivers to receive such individualized instruction and education with a minimal amount of time out of the driver's seat, to better serve both the drivers and their employees. Further, such a system should also track compliance and completion of the customized courses for each driver to help ensure the employer that their goals for safety through driver monitoring and education are being met.

The forgoing examples of related art of driver safety and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The system herein employing software adapted to the task and running in electronic memory in communication with a computing device such as a computer, is configured to calculate and automatically assign relevant driver training courses and content, to drivers, based on driving behavioral data which is collected on an ongoing basis in the vehicle driven by each respective driver.

In the system, the system provider will communicate to each driver who wishes to, or is required to become a user by their employer, a registration graphic interface. The registration graphic interface will allow the driver to become a registered user through the input of personal information in areas provided in one or a plurality of pages in the registration graphic interface. The inputted personal information will be saved to electronic memory and related to each respective registered user.

In the case of all drivers, the system is configured to communicate a test graphic interface configured to administer a personality assessment test to each registered user. Using the input answers from each respective user from the test graphic interface, software adapted to the task running in electronic memory of the computer or server or the like of the system provider, which will determine a user personality profile for each registered user. Such personality assessment tests, for example the MYERS-BRIGGS personality inventory, are well established in the art of determining a psychological profile for a test taker from a finite group of psychological profiles, based on their answers to questions presented them. Such a test is well adapted to predict user behavior based on differences in the ways individuals prefer to use their perception and judgment.

Using the ascertained personality profile for each registered user, resulting from their input answers to the test, the system employing software adapted to the task of matching personality profiles will ascertain from a database of driving habits cross referenced to such personality profiles, predicted driving habits for each user based on their ascertained personality profile.

In another step, using the predicted driving habits ascertained, the system using software adapted to the task of matching ascertained driving habits with remedial courses determined to aid such habits, the system will then assign, to each respective user, a first remedial driving course to be taken, which has been adapted to aid in remediation of any unsafe or otherwise unwanted driving habits predicted by the driver personality profile cross referenced with the stored database of potential driver habits related to each respective personality profile.

The driver can be notified of the need to take the assigned course or courses, before ever taking the wheel of the vehicle for the employer, or could be assigned the remedial courses after a determined number of days or miles driving for the employer. Such may be by email, telephone message, text message, regular mail, or other means of notification that the driver is to take training. The training is preferably provided over a network to a computing device of the driver, using graphic interfaces including course material and video lectures and the like. Graphic interfaces, for input by the driver, may also be provided to have the driver input their presence and completion of the course and to test the driver for their learning of the presented material.

Thereafter, on an ongoing basis, the system is configured to retrieve and/or employ an electronic historical driving record of a driver, captured and stored as driver telematics in electronic memory of a driver monitoring device. Such a monitoring device may be physically installed in a particular vehicle, or may otherwise be placed in electronic communication with the vehicle driven by each user of the system to hold driver telematics relative to the driving habits of a driver over a time period.

Such electronic communication may be with the OBD port of the vehicle or by another operative electronic connection with the onboard computer of each vehicle. For example, but in no manner limiting, retrieval of driver telematics held in electronic memory can be by wireless communication such as over a cellular network, by a triggered transmission by a communicated signal from a remote transceiver, or by other wired or wireless transmission of driver telematics which are captured to electronic memory either in the vehicle itself, or telematics which are communicated to a remote server and related to an individual driver. The telematics can be but need not be held in electronic memory of the driven vehicle such as in a vehicle computer. Such computers are employed in almost all modern vehicles and continually monitor many factors of vehicle performance and movement attributable to the driving habits of a driver, such as speed, turning, acceleration, braking, fuel usage, and other factors. Thus, an electronic connection and communication of driver telematics to the OBD port on the vehicle, or another wired or wireless connection noted above, can capture streams of such vehicle and driver telematic information and store this driving-habit related information in electronic memory in a relational database where it is associated with an individual driver.

Driver habit related information or telematics can also be determined and stored in electronic memory of the monitoring device, such as stopping speeds, acceleration after stopping and while cruising, turns, lane changes, and other information which a GPS system in many vehicles monitors and records, or a GPS system in the onboard monitoring device can ascertain and record. This monitoring device or that of the vehicle if present, may also ascertain and store the locations to which the vehicle travels, and the manner of driving in-between locations, and times of day for such trips to determine both daylight and nighttime driving information. This too can be included in the captured and stored telematic information concerning ongoing driving habits, of each driver.

As noted, at determined intervals, all such information and data streams of driver telematics, are communicated to and recorded into electronic memory, and subsequently communicated to the system provider using any manner of communication such as but not limited to, cellular connection, wifi, bluetooth, or other wireless communication, or by a physical wired connection with the onboard monitoring device, or a remote monitoring device where driver telematics and vehicle performance electronic data have been stored in relation to each driver. In all such modes of connecting the monitoring device, the stored data of driver telematics in electronic memory relating to each driver of a vehicle, is offloaded and communicated electronically to electronic memory available to the computing system of the system provider.

On recurring dates determined by using one or a combination of factors to determine a review time, from a group of factors used to determine a review, including miles-driven, days driving since last review, and driver review rules of the employer, the driving habits of each employee being monitored will be chosen for review. This will be accomplished using the data from the monitoring device engaged with the employee-driven vehicle, which has been communicated to electronic memory of the computing system of the system provider.

Software running on the computer of the system provider and adapted to employ the offloaded electronically recorded driver telematic information from electronic memory, relating to actual driving of each driver over a determined time period, is employed to ascertain driver skill and driver performance and driver safety concerns, and one or more of which is outside established criteria and in need of improvement. Such a determination of driving skills or performance areas may be related to either safety reasons or job performance reasons or employer rules for goals or shortcomings of the driving of their employees.

In a first consideration of determining an assigned course for customized instruction or remedial education of a driver, the system of the system provider employs the offloaded telematics which were the electronically stored information concerning each driver, for the duration of days, weeks, or months, and/or for geographic distances driven in each prior trip by each driver.

Using the telematics or electronically stored data associated with each driver, for each driving trip, over a determined amount of time, or miles, the system is able to discern any safety issues in driver performance. Further, driving skill issues and general or driving performance issues are also identifiable for each driver based on their saved telematic record from driving each vehicle.

For example such may be accomplished using electronically stored driver trip performance data which is also cross referenced to highways using GPS location information of the driven vehicle in such data. In this manner the driving performance of each driver, on each driving trip from start to arrival can be tracked. On each vehicle driven by each driver, the electronic monitoring component stores telematic data concerning the driving of the vehicle which is saved in electronic memory as stored driver trip performance information.

Such electronically stored driver telematics regarding performance information may include one or a combination of driver vehicle operation traits, from a group including vehicle speeding or observance of speed limits, hard acceleration, hard or even braking, trip route choice such as routes with left turns or requiring reverse driving to leave stops, duration of time driven per day, multiple lane changes, swerving, night performance vs. daylight performance, and other individual vehicle operation traits of each respective driver of a vehicle under control of each respective driver.

If the vehicle being driven is equipped with forward looking radar or ADAS (Advanced Driver Assistance Systems) used on many vehicles for emergency braking, the system can store the distances chosen by the driver from vehicles they trail. This driver trip performance information is stored and associated with each identified driver as stored driver data, which effects both safety and job performance and driving costs, and wear and tear on vehicles driven.

Additionally considered in the customization of training provided individual drivers can be third party historical data over a term of previous months or years, concerning the performance, infraction, and compliance, of each driver. This historical data is directly associated with the drivers license of each respective driver. Such gathered historical data information can include traffic infractions, criminal charges, intoxicated driving reports or infractions, and other data concerning driver behavior and performance over a long term.

Software running in electronic memory of the computing system of the system provider will employ this driver performance information garnered from telematics, and using software configured to compare driver telematics to a database of desired driver performance ascertain driver vehicle operation traits, which are not desirable, based on the database of norms to which the driver performance information is compared.

With driver skill or performance areas so identified, the system, using software configured to match determined driver skills slated for improvement, will match the skills or driver performance areas determined as having shortcomings to a database of educational courses correlating to improving the one or multiple skills determined as lacking. Using these determined matches to courses to improve driver skills or remediate driver shortcomings, the system will automatically assign a course of remedial educational courses and videos and the like to the respective employee chosen for review.

With regard to the remedial courses assigned to each driver during a review, the employer of each driver can input rules or requirements used in the matching of remedial or educational courses to each respective driver, which stress a company goal for their drivers. This allows for customization of the assigned courses for training and education for drivers of that company.

In a particularly preferred mode of the system herein, the originally determined personality profile of each respective employee can also be employed by the software of the system provider matching discerned employee driving skill and habit shortcomings to remedial courses to be assigned. In this mode, the determined personality profile can act as a multiplier or factor to increase the assignment of certain remedial courses, where driver telematic information identifies a driving habit or driving skill shortcomings, which is or can be exacerbated by the discerned employee personality profile. For example, if the personality profile identified indicates the possibility of a lack of patience in certain driving situations, the employee might be assigned courses for anger management over another course for lane changes, where driver telematics show the employee spends a lot of time in traffic jams.

The employee can be notified by email, text messages, regular mail, or other means for employee notification that they have been selected to take ongoing driving courses. Once an employee is notified, the system herein will monitor driver compliance for attending and/or completing the assigned courses, which in the preferred mode are provided to each employee over a network by communication of graphic displays which include videos and written information and may include graphic interfaces communicated to each employee testing them for their learning of the communicated information subsequent to the employee taking a remedial course.

Using the system herein, each driver for each employer can be provided with new or remedial instructional courses which are highly targeted for their discerned driving habits, skill, temperament, and other characteristics determined in need of instructional help.

The system can thereafter, using software configured to compare subsequent gathered and stored telematic data of driver trip performance and comparing it to previously gathered telematic data of driver performance, ascertain if the driver's traits, skills, habits, or performance issues previously identified as needing new or remedial instruction, were in fact improved subsequent to the driver receiving that identified courses. If not, in subsequent assigned remedial or skill increasing courses, the driver may be assigned new courses for the identified performance shortcomings and any new discerned driving skills lacking.

Additionally, the system herein can be employed to identify potential health issues of drivers being monitored. Because drivers may frequently drive trips where they drive over substantially the same route, the system in this additionally preferred mode of operation can be employed over longer durations of time to help determine potential employer concerns such as driver health and physical ability to perform their job.

In one manner of such operation, the system can compare the telematics gathered on ongoing driver vehicle operation traits of a driver over a first period of time, to those of the same driver over a subsequent period of time. Employing software operating to ascertain determined differences found in the telematics as to the driver's vehicle operation traits during the two time periods, the system can employ the software to operate to also ascertain health problems from a database of health problems held in electronic memory determined to be associated with respective determined differences. The driver and/or employer could then be notified of one or more suspected health issues.

The stored driver trip performance telematic data for a driver who drove a particular route many times over five years, for example, can be compared to ascertain if the driver's performance is being affected by aging or a physical problem. A driver who has increasing vision problems may, in the evening, drive quite differently from their performance during daylight due to the inability to read signs or where vision might be affected by cataracts. Further, a driver may have slowing reaction times causing braking and acceleration performance which differs from that recorded months earlier.

By comparing telematic data of each driver in differing time periods, over a series of months or years, patterns can be determined showing potential vision or reaction times by the driver. Using software configured to take this telematic information of each driver over multiple time periods, such as months or years, the system can determine possible driver health issues which correlate to the change in driver telematic information over time. Such possible health issues can be communicated to the employer who can choose to take actions to ascertain any health issues. For example, if the software comparing the telematic information of a driver indicates a change in driving habits associated in a database of such changes to vision problems, the employer can make sure the driver is tested and provided eyeglasses if needed.

With respect to the above description, before explaining at least one preferred embodiment of the herein disclosed driver monitoring for customized remediation training system herein in detail, it is to be understood that the invention is not limited in its application to the details of construction and to the arrangement of the software enabled system of the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing other driver performance monitoring systems and for carrying out the several purposes of the present driver monitoring and training easement system herein. It is important, therefore, that the claims be regarded as including such equivalent construction and methodology insofar as they do not depart from the spirit and scope of the present invention.

It is an object of the invention to provide a driver performance monitoring and review system, which predicts probable driver performance or driving habits, based on a determined psychological or personality profile of each driver from a database associated with input test answers.

It is a further object of this invention to provide employing software operating for monitoring the ongoing driving of drivers and identify skill shortcomings and undesirable driving habits of monitored drivers.

It is a further object of this invention, to provide such a system which can employ historically gathered electronic driver trip performance information stored as telematics and employ software operating to calculate and assign a customized course of instruction for each driver to improve identified driver performance shortcomings.

These and objects of the invention will be brought out in the following part of the specification, wherein the detailed description of the software enabled system herein is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting.

DETAILED DESCRIPTION OF THE PREFERRED EMBODIMENTS OF THE INVENTION

As used in the description herein any of the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present.

Figure 1:
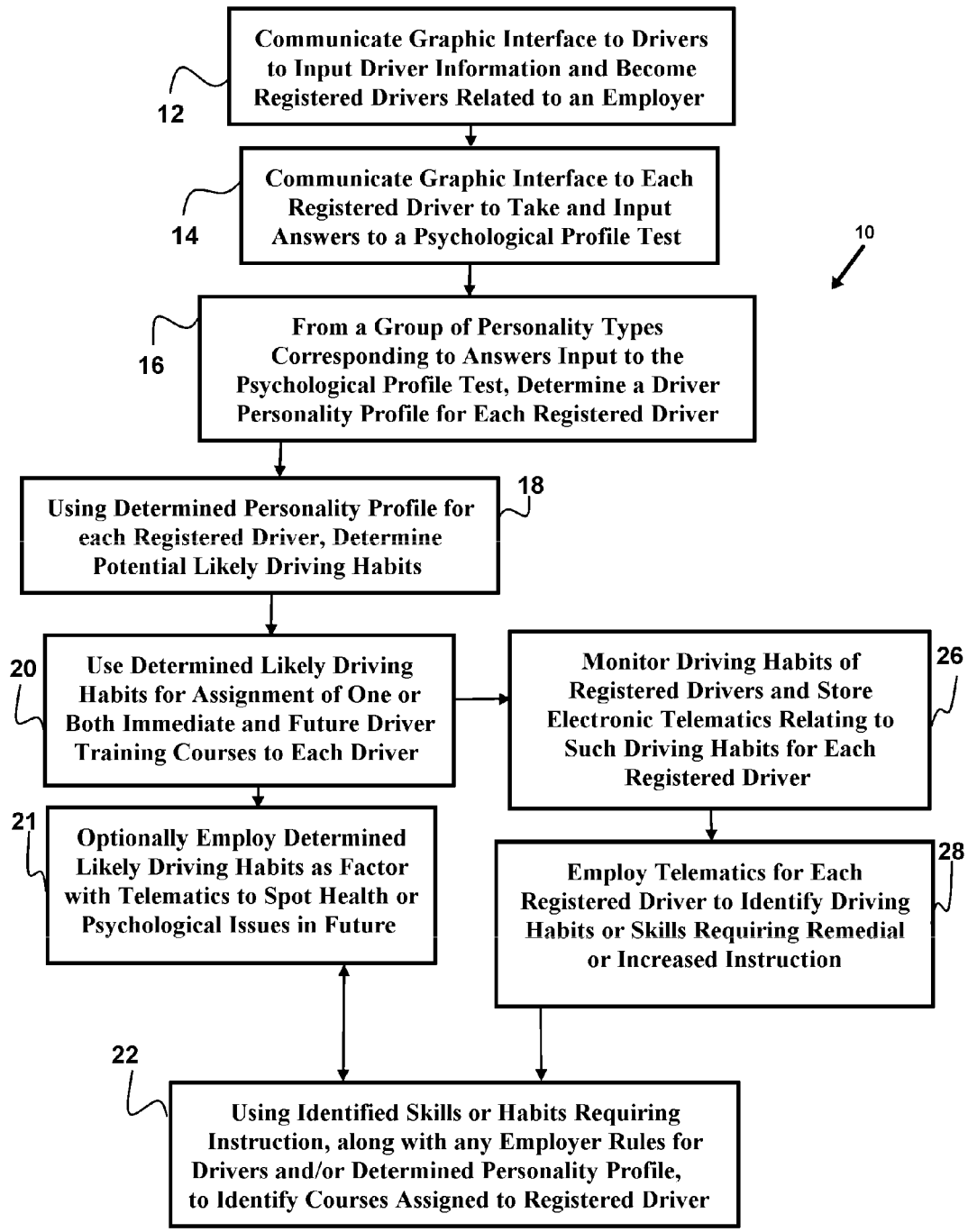
FIG. 1 depicts a simplified flow chart of the system herein provided, employing software adapted to the tasks noted and running in electronic memory on a networked computer system of the provider.
Figure 2:
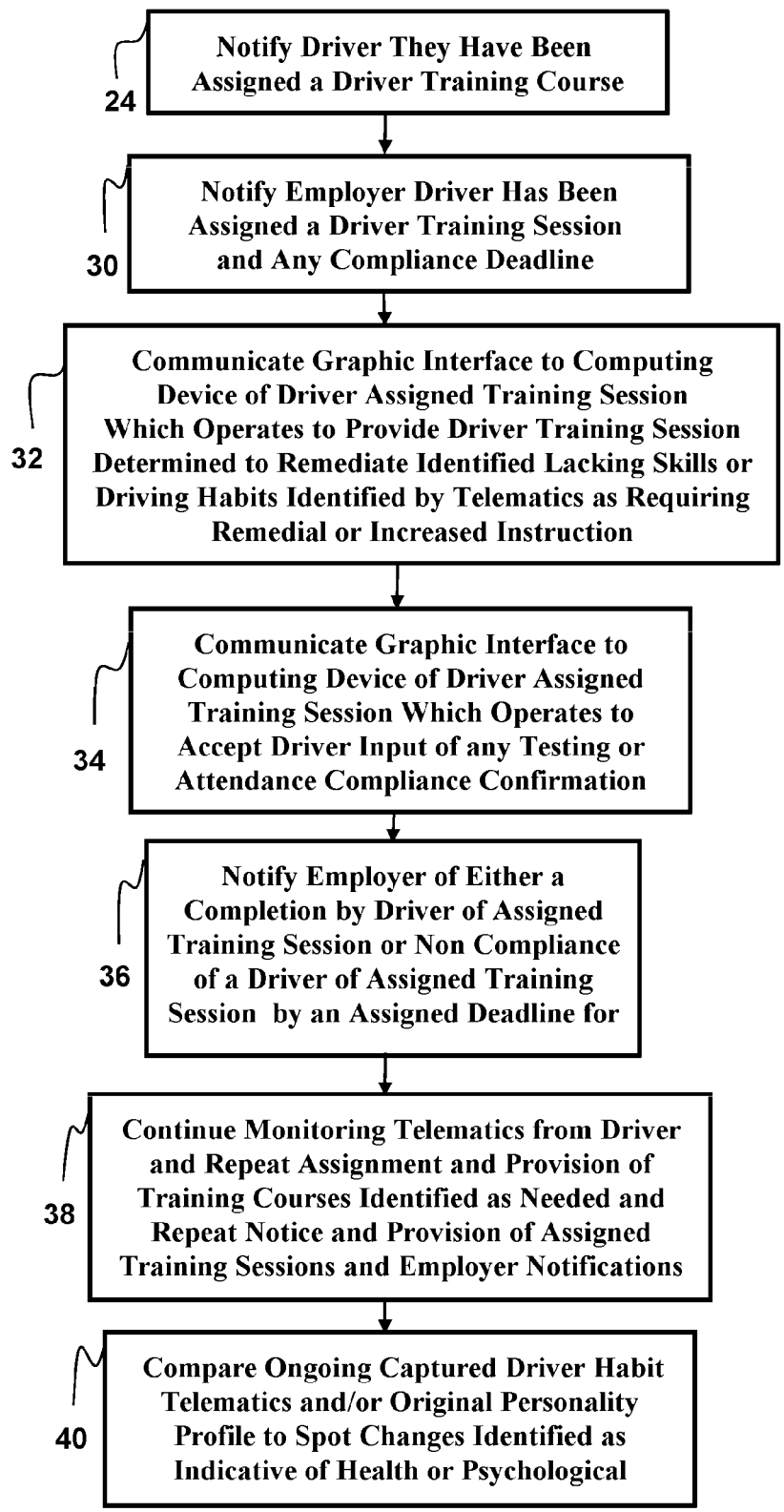
FIG. 2 is a continuation of the flow chart of FIG. 1 showing the system herein being operated by software adapted to the depicted and related steps running on or communicating with users and employers through a network connected server.

Now referring to the system 10 herein, shown in the flow chart of FIG. 1, there is depicted the preferred steps in the system 10 herein, which is software enabled employing software running in electronic memory of a computer or server or the like of the system provider, which is connected to a network such as the internet. In the system, software, configured to generate and communicate graphic interfaces configured to operate each task or step at hand and to receive inputted information from input areas provided within those graphic interfaces operating to the step or task of the system, is configured to run in electronic memory of a computing system connected to a wide area network.

As described in the summary of the invention above, the system 10 includes steps to register the drivers of employers, who will subscribe to the system 10 herein, and provide ongoing monitoring of driving habits of the drivers.

In one step in the system the computer or server of the system provider will communicate a graphic interface to the computer of a driver 12, operating to allow input of personal information whereupon the driver 12 becomes a registered driver associated with an employer subscribing to the system 10. The graphic interface operates using one or more communicated displayable pages of information and fields configured to operate to input text and information to enable the registration of a registered employee related to an employer.

In a step particularly preferred in all implementations and modes of the system 10 herein, software running on the computing system of the provider will communicate a graphic interface which is adapted for display on the computing device of a registered driver, which operates to administer a psychological profile test 14 to the driver. One or a plurality of graphic interface pages are communicated to the display of the computing device of the registered driver, which operate to ask questions and otherwise enable the communication of input of answers to those questions by the registered driver. The input information and answers from the psychological test, which are related to each respective registered driver, are stored in electronic memory of the system provider.

Using software configured to operate and employ the electronically stored input information from answers to the questions in the psychological test, the system then ascertains a driver personality profile 16. Such is accomplished using software operating to match the input answers and information associated with each driver, and to determine a personality profile from one of a group of predetermined personality profiles held in a database, and known to match the test information input by respective drivers and held in electronic memory. Such a database of personality profiles known to match certain driver answers is held in electronic memory and may be initially, or preferably continually, employed by the software to monitor and predict respective predicted driver habits. This determined respective individual personality profile from the group of personality profiles is associated with each respective registered driver and stored in electronic memory of the computing system of the system provider.

In a step of the system using software configured to operate the task of employing the determined driver personality profile for each registered driver, and compare that driver personality profile to a database of known driving habits associated with the determined driver personality profile, the predicted likely driving habits for the each respective registered driver are identified 20.

In a step of the system 10 employing software running in electronic memory of the system provider which is configured to operate to employ these likely driving habits and to discern a match to remedial courses stored in electronic memory of the system provider, which are determined to provide remediation to the discerned likely driving habits which are undesirable, the system 10 can either assign a remedial course for the registered driver to take 22 immediately, and/or the system 10 can employ the discerned likely driving habits as a factor in future identification of courses to be taken 22 by the registered driver. Because newly hired drivers have no discernable record for driving on the job, and because employers for legal and other reasons require drivers with poor or potentially dangerous driving habits to be monitored for remediation, it is preferable that the system 10 assign the calculated remedial driving courses to registered drivers immediately or early in their employ, in the system.

Where immediate remedial courses are determined 22 and the employer wishes courses to be taken by the registered driver based solely on the likely driving habits 18 related to the determined personality profile 16, the system will notify the registered driver 24 they have been assigned a driver training course 24 and will notify the employer 30 of such. The registered driver will be given either a physical training site to visit or access over the network to the assigned training which may be done on a remote computing device, and time limit to accomplish the course.

Thereafter, the system 10 will employ software operating to generate and provide graphic interfaces to the computing device used by the registered driver, to administer the courses 32. The software will also allow for the registered user to input attendance information and any testing answers 34.

As it is important for employers to maintain records of driver compliance with company rules and to show safety and driver monitoring and remediation, the system 10 will notify the employers of compliance or non-compliance of each employee to the accomplishment of assigned driver training courses 36.

On an ongoing basis, the system 10 will employ software operating for the step of gathering electronic telematic data which is related to each registered driver from the vehicle being driven by the registered driver, to monitor the driving of the registered driver 26. The electronic data will be stored in electronic memory of the electronic storage device which may be mounted directly in the vehicle or placed in operative communication with the vehicle, to record the telematics concerning all monitored driving habits of the registered driver.

On this ongoing basis, after a determined period which may be based on time or miles driven by the registered driver, the system 10, employing software operating to the task of employing the stored electronic data or telematics, relating to the monitored driving habits of each registered driver to identify driving habits or skills requiring remedial or increased instruction 38. In the fashion noted above, system software will operate to notify each driver of newly assigned courses and track compliance.

Further, in another step on an ongoing basis which may be optional but for reasons noted above is preferred, the system 10 running software in electronic memory which operates to employ the identified driving habits or skills requiring new or increased or remedial instruction from gathered telematics 26 and employ the determined likely driver habits 21 related to their determined driver personality profile 18, as a secondary factor or multiplier in determining ongoing driver habits in need of remedial instruction 22.

In this step, the personality profile 18 and determined related likely driving habits 20 may be employed by the software and operate as a factor in calculating the remedial instruction for the respective registered driver and in some instances the health of a driver. For example, if the telematics of past driving for the registered driver 26 once employed identify many instances of slow driving in traffic jams 28, and the determined personality profile 16 of the driver has been associated with likely driving habits 18 which indicate the registered driver may become angry in such traffic, the software operating to match captured telematics to matching assignable remedial courses can use this determined driving habit 18 as a factor in addition to telematics and can assign anger management remedial courses in the identification of courses 22 for a registered driver.

Since driver mental conditions such as anger are not discernable by driver telematics 26, and anger is known to cause road rage, the employment of these determined likely driving habits 20 to assign driver training classes in addition to performance issued identified by telematics, can have a significant effect in heading off potential driver problems, and such is preferred in the system 10.

Subsequent to each identification by the software of the system 10 which operates to identify courses to be taken by a registered driver 22, the registered driver is notified and provided with graphic interfaces over the network which are employable on their computing device, to participate and show compliance and the employer notified as noted above.

Finally, the system 10 can employ captured driver telematics for sequential time periods to help determine any health conditions which a registered driver 22 may be starting to suffer. On an ongoing basis, after a determined time period which may be based on time or miles driven by the registered driver 22, or simply days, months, or years, the system 10, employing software operating to the task of employing the stored electronic data or telematics, relating to the monitored driving habits of each registered driver 22 to identify driving habits or skills requiring remedial or increased instruction 38, can compare the captured data or telematics for each driver to ascertain health problems over differing time periods.

In this mode, the system 10 employs software operating to compare captured telematics held in electronic memory which relate to actual driving habits of each said registered driver 22 over a first duration of time, with said telematics which relate to actual driving habits of each registered driver 22 over a second said duration of time, to ascertain determined differences in each driver's actual driving habits. Thereafter, the system 10 employs software operating to match each determined difference, with a database of health problems held in electronic memory which have been predetermined to be associated with respective determined differences. For example slowing night driving found in a later time period telematics from a time period a year earlier, can be indicative of vision problems such as cataracts. The system 10 can then notify one or both of the driver and the employer of the possible health issue.

As can be seen, the system 10 provides for ongoing monitoring of registered driver behavior and driving habits which allows the employer subscribing to the system, have any identified shortcomings of their drivers identified, and addressed with appropriate action and courses. Such benefits both the employer and their employee on an ongoing basis.

While all of the fundamental characteristics and features of the driver monitoring and education determination system is described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are considered included within the scope of the invention as defined by the following claims.

What is claimed:

1. A method of determining ongoing driving habits of drivers from electronic data stored as telematic information in vehicle electronic memory of a motor vehicle, and providing remedial driver training using a computer having electronic memory, comprising:

communicating a registration graphic interface displayable on a computing device operated by a driver which operates to enable said driver to input driver information and thereby become a registered driver related to an employer;

assembling a registered driver profile from said inputted driver information and storing said registered driver profile relating to each respective said registered driver, in said electronic memory;

receiving said telematic information from an onboard monitoring device and storing said telematic information in said vehicle electronic memory;

employing telematic capture software running in said electronic memory to capture said telematic information from said vehicle electronic memory of said motor vehicle previously driven by said registered driver;

determining said ongoing driving habits correlating to said telematic information captured from said vehicle electronic memory of said motor vehicle previously driven by said registered driver;

employing course identifying software operating to examine said ongoing driving habits so determined, and to identify remedial driver training courses which are predetermined to remediate one or more of said ongoing driving habits; and notifying said registered driver to attend a driver training session relating to said ongoing driving habits at a designated location.

2. The method of claim 1, additionally comprising:

requiring said registered driver to input attendance at said driver training session; and communicating to said employer a notice notifying said registered driver completed said driver training session relating to said ongoing driver habits.

3. The method of claim 1, additionally comprising the steps of:

communicating a testing graphic interface operating to administer a psychological profile test of said registered driver which is displayable on a computing device operated by said registered driver;

receiving inputted answers from said testing graphic interface;

from said inputted answers, determine a driver personality profile of said registered driver;

storing said driver personality profile in said electronic memory as related to said registered driver profile;

employing matching software operating to determine likely driving habits of said driver correlating to said driver personality profile, from a stored database of individual driving habits which are predetermined as associated with said driver personality profile; and employing said course identifying software to examine determined said likely driving habits and identify said remedial driver training courses which are predetermined to remediate one or more of said ongoing driving habits.

4. The method of claim 2, additionally comprising:

communicating a testing graphic interface operating to administer a psychological profile test of said registered driver which is displayable on a computing device operated by said registered driver;

receiving inputted answers from said testing graphic interface;

from said inputted answers, determine a driver personality profile of said registered driver;

storing said driver personality profile in said electronic memory as related to said registered driver profile;

employing matching software operating to determine likely driving habits of said driver correlating to said driver personality profile, from a stored database of individual driving habits which are predetermined as associated with said driver personality profile; and employing said course identifying software to examine determined said likely driving habits and identify said remedial driver training courses which are predetermined to remediate one or more of said ongoing driving habits.

5. The method of claim 1, additionally comprising:

capturing a first set of said telematic information correlating to said ongoing driving habits of said driver over a first period of time, from said vehicle electronic memory of said motor vehicle previously driven by said registered driver, capturing a second set of said telematic information correlating to said ongoing driving habits of said driver over a second period of time, from said vehicle electronic memory of said motor vehicle previously driven by said registered driver;

determining differences between said first set of said telematic information and said second set of said telematic information;

employing comparing software operating to compare said differences with a database of health problems held in said electronic memory which are associated with respective said differences determined between said first set of said telematic information and said second set of said telematic information; and communicating to one or both of said employer and said registered driver a listing of any said health problems.

6. The method of claim 2, additionally comprising:

capturing a first set of said telematic information correlating to said ongoing driving habits of said driver over a first period of time, from said vehicle electronic memory of said motor vehicle previously driven by said registered driver, capturing a second set of said telematic information correlating to said ongoing driving habits of said driver over a second period of time, from said vehicle electronic memory of said motor vehicle previously driven by said registered driver;

determining differences between said first set of said telematic information and said second set of said telematic information;

employing comparing software operating to compare said differences with a database of health problems held in said electronic memory which are associated with respective said differences determined between said first set of said telematic information and said second set of said telematic information; and communicating to one or both of said employer and said registered driver a listing of any said health problems.

7. The method of claim 3, additionally comprising:

capturing a first set of said telematic information correlating to said ongoing driving habits of said driver over a first period of time, from said vehicle electronic memory of said motor vehicle previously driven by said registered driver, capturing a second set of said telematic information correlating to said ongoing driving habits of said driver over a second period of time, from said vehicle electronic memory of said motor vehicle previously driven by said registered driver;

determining differences between said first set of said telematic information and said second set of said telematic information;

employing comparing software operating to compare said differences with a database of health problems held in said electronic memory which are associated with respective said differences determined between said first set of said telematic information and said second set of said telematic information; and communicating to one or both of said employer and said registered driver a listing of any said health problems.

8. The method of claim 4, additionally comprising:

capturing a first set of said telematic information correlating to said ongoing driving habits of said driver over a first period of time, from said vehicle electronic memory of said motor vehicle previously driven by said registered driver, capturing a second set of said telematic information correlating to said ongoing driving habits of said driver over a second period of time, from said vehicle electronic memory of said motor vehicle previously driven by said registered driver;

determining differences between said first set of said telematic information and said second set of said telematic information;

employing comparing software operating to compare said differences with a database of health problems held in said electronic memory which are associated with respective said differences determined between said first set of said telematic information and said second set of said telematic information; and communicating to one or both of said employer and said registered driver a listing of any said health problems.

9. The method of claim 1, wherein said telematic information comprises stopping speeds, acceleration after stopping, cruising, turns, braking, and lane changes.

10. The method of claim 1, wherein said onboard monitoring device includes a GPS system.

* * * * *